Dec. 2, 1941.  A. JACKSON  2,264,979
LIFTING JACK
Filed Aug. 29, 1939
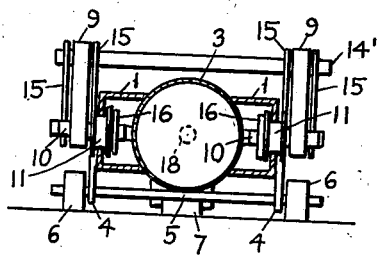
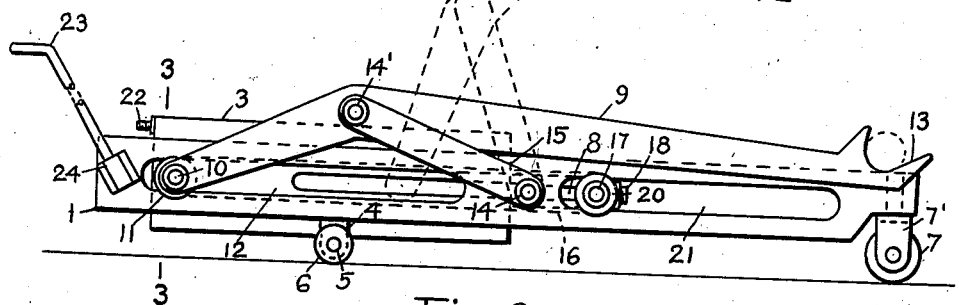
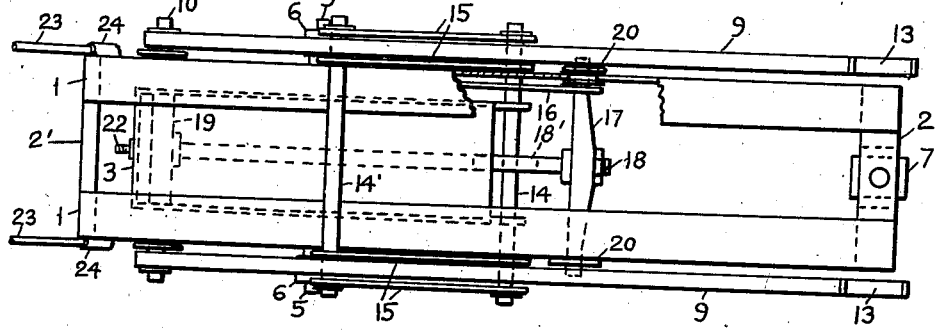
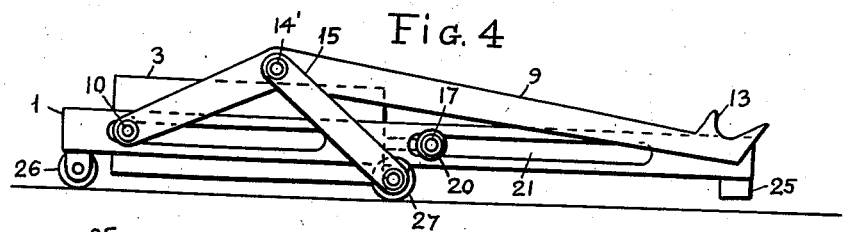
ALEXIS JACKSON
INVENTOR.
BY John P. Nixonov
ATTORNEY.

Patented Dec. 2, 1941

2,264,979

UNITED STATES PATENT OFFICE 2,264,979

LIFTING JACK

Alexis Jackson, Niagara Falls, N. Y., assignor to Vadim S. Makaroff, New York, N. Y.

Application August 29, 1939, Serial No. 292,369

6 Claims. (Cl. 254—8)

My invention relates to lifting jacks and has particular reference to jacks operated by compressed air or a fluid under pressure.

My invention has for its object to provide a lifting jack which can be used for raising an automobile or a similar vehicle by its axle, front or rear, to a substantial height when it is desired to do a certain work on the under side of the chassis of the vehicle, utilizing air pressure as a lifting power.

Another object of my invention is to provide a lifting jack of a relatively low overall height when its lifting arms are lowered in order to facilitate its movement under the vehicle. I provide my jack for this purpose with a horizontally mounted air cylinder and articulated joints for the lifting arms whereby the arms lie low when the cylinder is de-energized and are raised to a substantial height when power is applied.

Another object of my invention is to provide a stable and low support for the lifting arms. I provide the arms for this purpose with articulated joints so arranged that each arm rests on two spaced points on the base of the jack, the articulated member and the lower portion of the arm forming a triangle with its base on the base of the jack.

As a modification, I provide my jack, in addition to the middle wheels, also with rear wheels supporting the weight of the air cylinder, the front end of the jack being raised when there is no load, the raised portion having a flat shoe which is brought down by the weight of a vehicle when it is lifted, thereby preventing rolling of the jack on its wheels when the vehicle is in the raised position, the rear wheels being then lifted above the ground.

My invention is more fully described in the accompanying specification and drawing in which—

Fig. 1 is an elevational view of the jack.

Fig. 2 is a plan view of the same.

Fig. 3 is a sectional view taken on the line 3—3 of Fig. 1.

Fig. 4 is an elevational view of a modified device.

Fig. 5 is a similar view of electric jack.

My lifting jack consists of a frame or base formed of two beams 1 joined at the front by a cross piece 2 and at the rear by a cross piece 2'. The beams are preferably of a channel shape, having inward turned flanges. A cylinder 3 is attached to the flanges of the rear portions of the beams, thereby joining the beams together into a rigid structure. Brackets 4 are provided at the middle portion of the beams for shafts 5 with wheels 6 at the ends. The front end of the frame is supported on a wheel 7 in a caster 7'.

Lifting arms 9 are provided at the sides of the frame, the rear ends of the arms having shafts 10 with rollers 11 slidably fitted in slots 12 in the rear portions of the beams 1. The front ends of the arms have forks 13 adapted to engage a portion of a vehicle such as its axle. The arms are further supported on the frame 1 by links 15 pivoted on a shaft 14 and pivotally connected to the arms on a shaft 14' intermediate of the ends of the arms. For moving the rear ends of the arms 9, the shafts 10 are connected by bars 16 with a cross-bar 17 attached to the end of a piston rod 18 extending from a piston 19 slidably fitted in the cylinder 3. The ends of the cross-bar 17 have rollers 20 sliding in slots 21 in the front portions of the beams 1. The bars 16 are provided with slots 8 for the shaft 14, the piston rod having a slot 18' for the same purpose. The shaft 14 is preferably placed transversely to the center line of the cylinder 3.

The cylinder has a nipple 22 with an ordinary tire valve for connecting it to a flexible hose ordinarily used for pumping air into automobile tires. The air pressure in the cylinder will force the piston outward, pulling the rear ends of the arms 9 forward and thereby turning the arms into raised position as shown in dotted lines in Fig. 1. The arms 9 in the raised position rest partly on the rollers 11 and partly on the shaft 14 through the links 15 which form supporting triangles with the rear portions of the arms. Handles 23 may be provided at the rear slidably fitted in sockets 24 in the beams 1.

A modified construction is shown in Fig. 4. The front end of the frame is provided with a flat shoe 25 raised from the ground when the weight of the cylinder causes the rear end of the jack to rest on wheels 26. The shoe engages the ground or floor when the front end of the jack is depressed by the weight of an automobile being lifted. The shoe prevents the jack from being accidentally moved when the vehicle is in the raised position. In this modified form of the jack, the wheel shaft 27 also supports the lower ends of the links 15 below the center line of the cylinder so that it is not necessary to provide the piston rod and the bars 16 with longitudinal slots.

Another modification is shown in Fig. 5. The arms 28 are pivoted at 29 to the frame 30 and are pivotally connected at 31 to links 15 pivoted to the ends of a cross bar 32 sliding in slots 33 in the frame 30. The cross bar is threaded for a screw 34 operated by an electric motor 35 through gears 36, 37. The screw moves the cross bar rearward, pushing the links 15 and raising the arms with the load.

It is understood that my jack can be further modified without departing from the spirit of the invention, as set forth in the appended claims.

I claim as my invention:

1. A lifting jack comprising a frame formed of two longitudinal beams joined at the ends, a plurality of wheels supporting the frame, a pair of levers slidably supported at their rear ends on the frame, the front ends of the levers being adapted to support an automobile axle, links pivotally connected at their ends to intermediate portions of the levers, a cylinder supported on the frame between the beams, a shaft passing through the frame in front of the open end of the cylinder, the other ends of the links being pivotally supported on the shaft, a piston slidably fitted in the cylinder, a piston rod extending from the piston and having a slot for the shaft, a cross-bar on the end of the piston rod, means to slidably support the cross-bar on the frame, elongated members pivotally connecting the ends of the cross-bar with the rear ends of the levers, and means to admit a fluid under pressure into the cylinder for moving the piston and thereby raising the front end of the lever.

2. A lifting jack comprising an elongated frame, having horizontally extending guides at the rear and front portions, wheels supporting the front and rear ends of the frame, links pivotally supported at their ends on the frame between the front and rear guides, levers pivotally supported on the other ends of the links, means on the rear ends of the levers to slidably engage the guides, the front ends of the levers being adapted to support an automobile axle, a cylinder horizontally supported on the frame, a piston slidably fitted in the cylinder, a piston rod extending from the piston, a cross-bar at the end of the piston rod adapted to slide in the front guides, elongated members pivotally connected to the ends of the cross bar, the other ends of the elongated members being pivotally connected to the rear ends of the levers, and means to admit a fluid under pressure into the cylinder for moving the piston and thereby moving the rear ends of the levers forward and the front ends upward.

3. A lifting jack comprising a frame having two horizontally extending beams in spaced relation to each other, a bridge at the front end of the beams, a horizontally extending cylinder mounted between the rear portions of the beams, the front and rear portions of the beams having longitudinal guiding slots, links pivotally supported at the ends on the beams between the front and rear slotted guides, levers slidably supported at the rear ends in the rear slotted guides, the front ends of the levers being adapted to support an automobile, the intermediate portions of the levers being pivotally connected to the other ends of the links, a piston slidably fitted in the cylinder, a piston rod, a cross bar at the end of the piston rod slidably supported in the front slotted guides, elongated members pivotally connecting the ends of the cross bar with the rear ends of the levers, and means to admit a fluid under pressure into the cylinder for raising the levers, the links with the rear portions of the levers and with the beams forming triangles with upright sides of constant lengths and with variable bases.

4. A lifting jack comprising a frame having two horizontally extending beams in spaced relation to each other, a bridge at the front end of the beams, a horizontally extending cylinder mounted between the rear portions of the beams, the front and rear portions of the beams having longitudinal guiding slots, links pivotally supported at the ends on the beams between the front and rear slotted guides, levers pivotally supported at the intermediate portions between their ends on the other ends of the links, rollers rotatively mounted on the rear ends of the levers and slidably fitted in the rear slots in the beams, the front ends of the levers being adapted to support an automobile, the intermediate portions of the levers being pivotally connected to the other ends of the links, a piston slidably fitted in the cylinder, a piston rod, a cross bar at the end of the piston rod, rollers at the ends of the cross bar slidably fitted in the front slots in the beams, links pivotally connecting the ends of the cross bar with the rear ends of the levers, and means to admit a fluid under pressure into the cylinder for raising the levers, the links with the rear portions of the levers and with the beams forming triangles with the upright sides of constant lengths and with variable bases.

5. A lifting jack comprising a frame formed of two longitudinal beams connected together at the front and at the rear, the beams having substantially horizontal guides in their rear portions, a pair of arms adapted to engage the axle of a vehicle by their front ends, the rear ends slidably engaging the guides, links pivotally connected to the middle portions of the arms, the other ends of the links being pivotally connected to the frame in front of the guides, the front portions of the beams having guides, a cross-bar slidably supported in the front guides, elongated members pivotally connecting the ends of the cross-bar with the rear ends of the arms, and a motor mounted on the frame adapted to move the cross-bar for raising the arms.

6. A lifting jack comprising a frame formed of two longitudinal beams connected together at the front and at the rear, the beams having substantially horizontal slots in their rear portions, a pair of arms adapted to engage the axle of a vehicle by their front ends, the rear ends slidably engaging the slots, links pivotally connected to the middle portions of the arms, the other ends of the links being pivotally connected to the frame in front of the slots, the front portions of the beams having slots, a cross-bar slidably supported in the front slots, elongated members pivotally connecting the ends of the cross-bar with the rear ends of the arms, and a motor mounted on the frame adapted to move the cross-bar for raising the arms.

ALEXIS JACKSON.